(12) United States Patent
Grompe et al.

(10) Patent No.: US 10,190,695 B2
(45) Date of Patent: Jan. 29, 2019

(54) CONVERTIBLE CHECK VALVE

(71) Applicant: Cornell Pump Company, Clackamas, OR (US)

(72) Inventors: Carl Grompe, Seattle, WA (US); Andrew Enterline, Troutdale, OR (US)

(73) Assignee: Cornell Pump Company, Clackamas, OR (US)

( * ) Notice: Subject to any disclaimer, the term of this patent is extended or adjusted under 35 U.S.C. 154(b) by 8 days.

(21) Appl. No.: 15/469,893

(22) Filed: Mar. 27, 2017

(65) Prior Publication Data

US 2017/0307092 A1    Oct. 26, 2017

Related U.S. Application Data

(60) Provisional application No. 62/326,237, filed on Apr. 22, 2016.

(51) Int. Cl.

| | |
|---|---|
| *F16K 27/04* | (2006.01) |
| *F16K 15/18* | (2006.01) |
| *F16K 15/14* | (2006.01) |
| *F16K 15/00* | (2006.01) |
| *F16K 15/03* | (2006.01) |
| *F16K 27/02* | (2006.01) |

(52) U.S. Cl.
CPC ............ *F16K 15/18* (2013.01); *F16K 15/00* (2013.01); *F16K 15/031* (2013.01); *F16K 15/14* (2013.01); *F16K 15/181* (2013.01); *F16K 27/0227* (2013.01); *Y10T 137/5196* (2015.04)

(58) Field of Classification Search
CPC ........ F16K 15/14; F16K 15/144; F16K 15/16; F16K 27/0227; F16K 15/181; F16K 15/031

USPC ..................................... 137/527, 527.6, 270
See application file for complete search history.

(56) References Cited

U.S. PATENT DOCUMENTS

| | | |
|---|---|---|
| 1,031,642 A | 7/1912 | Haase |
| 1,424,305 A | 8/1922 | Hofberg |
| 2,301,976 A | 7/1940 | Schellens |
| 2,447,947 A | 8/1948 | Larson et al. |
| 2,449,592 A | 9/1948 | Daddario |
| 2,454,160 A | 11/1948 | Greene |
| 2,581,047 A | 1/1952 | Salmond et al. |

(Continued)

OTHER PUBLICATIONS

"Check Valves," Val-Matic Valve & Mfg. Corporation, accessed Mar. 27, 2017 <http://www.valmatic.com/checkvalves.html>.

*Primary Examiner* — Umashankar Venkatesan
(74) *Attorney, Agent, or Firm* — Snyder, Clark, Lesch & Chung, LLP

(57) ABSTRACT

A convertible check valve having a pair of valve body sections, each of which includes a central passageway extending through it is disclosed. Each passageway terminates at an elliptical port. A moveable flapper is located within the check valve between the valve body sections and is movable between a between a closed state and an opened state, and vice versa, to effect the selective closing and opening of the ports. The valve body sections are configured to be rotated 180 degrees with respect to each other so that they are in an either an axially aligned state or in an elbow state. The interface between the passageways is formed by two elliptical shaped planar surfaces, each extending at an angle of 45 degrees to the central axis of the associated passageway. The valve also includes a pressure relief assembly.

20 Claims, 6 Drawing Sheets

(56) References Cited

U.S. PATENT DOCUMENTS

| | | | |
|---|---|---|---|
| 4,009,366 A | * | 2/1977 | Danell .................... F02N 19/10 137/856 |
| 4,476,891 A | * | 10/1984 | Mulas ................... F16K 27/067 137/270 |
| 4,639,016 A | | 1/1987 | Rogers et al. |
| 4,991,622 A | | 2/1991 | Brewer et al. |
| 5,261,449 A | | 11/1993 | Smetters |
| 5,746,246 A | | 5/1998 | Yokota et al. |
| 6,050,294 A | | 4/2000 | Makowan |
| 6,152,173 A | | 11/2000 | Makowan |
| 6,681,804 B2 | | 1/2004 | Horvath |
| 7,021,672 B2 | | 4/2006 | Ericksen et al. |
| 7,533,693 B2 | | 5/2009 | Colton, Jr. et al. |
| 7,938,631 B2 | | 5/2011 | Lisi et al. |

* cited by examiner

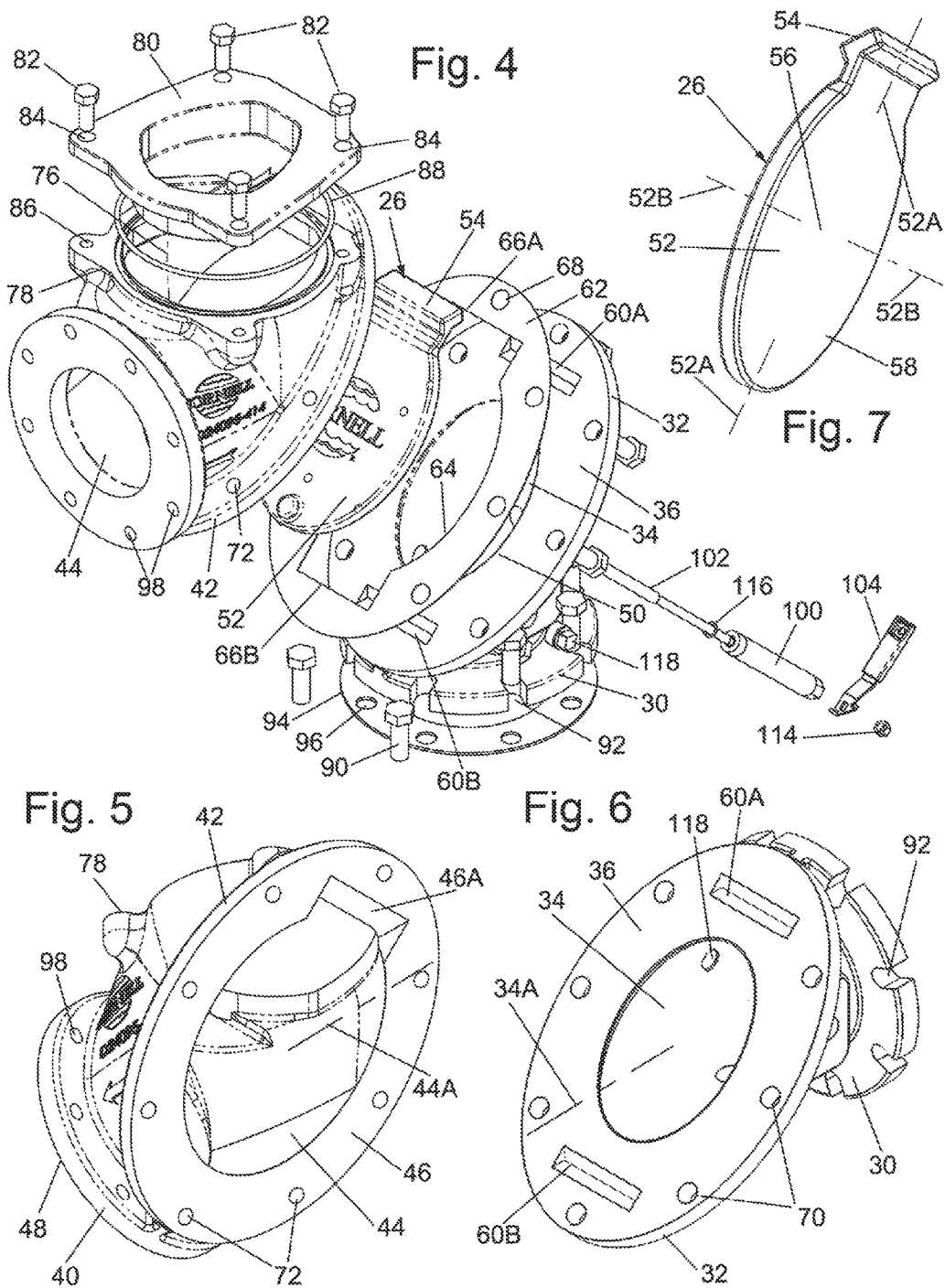

CONVERTIBLE CHECK VALVE

CROSS-REFERENCE TO RELATED APPLICATION

This application claims priority under 35 U.S.C. § 119, based on U.S. Provisional Patent Application No. 62/326,237 filed Apr. 22, 2016, the disclosure of which is hereby incorporated by reference herein.

FIELD OF THE INVENTION

The disclosed invention relates to check valves, and more particularly to flapper-based check valves that are convertible or configurable so that the inlet and outlet can be axially aligned or can extend perpendicularly to each other, e.g., be of an elbow configuration.

BACKGROUND OF THE INVENTION

Check valves are commonly used in water and wastewater systems to prevent reverse flow in such systems. Typically, these valves include a resilient disk or flapper which is mounted between the inlet section of the valve and the outlet section of the valve, e.g., at a 45 degree angle with respect to the flow path when the disk or flapper in its closed state. Commercially available check valves may incorporate inlet and outlet sections which are axially aligned or may extend perpendicularly to each other (commonly called an "elbow" configuration). Irrespective of whether the valve is an aligned type of valve or an elbow type of valve, the resilient disk or flapper is typically pivoted or flexed to an open position by the flow of liquid into the inlet section of the valve, whereupon the liquid can flow to the outlet section. In the event that the pressure within the check valve exceeds a predetermined level, e.g., an over-pressure in the outlet section exist, the resilient disk or flapper flexes or pivots downward into engagement with the valve seat to isolate the inlet section from the outlet section.

While commercially available check valves are suitable for their intended purposes a need exists for a check valve that is convertible from an aligned configuration to an elbow configuration, and vice versa, so that one valve can be used for either type of application, and which valve is simple in construction and operates efficiently irrespective of the configuration to which it is set. The subject invention addresses that need.

SUMMARY OF THE INVENTION

One aspect of this invention is a convertible check valve comprising a first valve body section, a second valve body section and a flapper valve member. The first valve body section has a first passageway extending therethrough. The first passageway has a first longitudinal axis. The first body section includes a first flange at one end thereof. The first flange has a first end surface extending at an angle of 45 degrees to the first longitudinal axis and at which the first passageway terminates, whereupon the shape of the first passageway at the first end surface is elliptical to establish a first elliptical shaped flow port thereat. The second valve body section has a second passageway extending therethrough. The second passageway has a second longitudinal axis. The second body section includes a second flange at one end thereof. The second flange has a second end surface extending at an angle of 45 degrees to the second longitudinal axis and at which the second passageway terminates, whereupon the shape of the second passageway at the second end surface is elliptical to establish a second elliptical shaped flow port thereat. The second end surface of the second flange is configured to be connected to the first end surface of the first flange in either an aligned configuration or an angled configuration, wherein the first and second longitudinal axes are collinear when in the aligned configuration and are perpendicular to each other when in the angled configuration. The flapper valve member is configured to be moved between a closed state and an opened state, and vice versa. The flapper valve member is configured to close the elliptical flow ports and thereby isolate the second passageway from the first passageway when the flapper valve member is in the closed state and is configured to open the elliptical flow ports to enable fluid communication between the second passageway and the first passageway through the elliptical flow ports when in the opened state.

In accordance with one preferred aspect of this invention the flapper valve member includes an engagement portion located adjacent its periphery, with the engagement portion being configured to engage a portion of the first valve body section immediately adjacent the first end surface to close the ports when the flapper member is in the closed state.

In accordance with another preferred aspect of this invention the flapper valve member comprises a main section of elliptical peripheral shape having a longitudinal axis and a transverse axis, with the longitudinal axis being longer than the transverse axis of the main section and with the engagement portion of the flapper valve member located adjacent the periphery of the main section.

In accordance with another preferred aspect of this invention the flapper valve member is formed of a flexible material and additionally comprises a mounting section. The mounting section projects outward from the main section at a portion of the periphery of the main section on the longitudinal axis of the main section. The mounting section is configured to be releasably secured to a portion of the first flange. The main section of the flapper valve member is configured to be flexed with respect to the mounting section when the mounting section is secured to the portion of the first flange to enable the main section to be moved from the closed state to the opened state and vice versa.

In accordance with another preferred aspect of this invention the first flange includes a pair of recesses located diametrically opposed to each other, with one of the recesses being configured to receive the mounting section of the flapper valve member when the check valve is in the aligned configuration, and with the other of the recesses being configured to receive the mounting section of the flapper valve member when the check valve is in the angled configuration.

In accordance with another preferred aspect of this invention the flapper check valve includes a pressure relief assembly. The pressure relief assembly comprises an elongated member having a free end in communication with the first passageway and configured to be extended to engage the flapper valve member at the intersection of the longitudinal and transverse axes of the flapper valve member to cause the engagement portion of the flapper valve member to be moved out of engagement with the portion of the first valve body section immediately adjacent the first end surface to thereby enable some fluid communication between the first and second passageways.

In accordance with another preferred aspect of this invention the second valve body section additionally comprises planar portion extending parallel to the second longitudinal axis, an opening in the planar top portion, and a clean-out cover releasably secured to the planar portion. The clean-out cover is located adjacent the particular recess in the first flange in which the mounting section of the flapper valve member is located irrespective of whether the flapper check valve is in the aligned configuration or the angled configuration, whereupon removal of the clean-out cover provides access to the mounting section of the flapper valve member

BRIEF DESCRIPTION OF THE DRAWINGS

FIG. 4 is an enlarged exploded isometric view of the convertible check valve of FIG. 1 shown in its angled (elbow) state;

FIG. 5 is an enlarged isometric view of one valve body section component of the convertible check valve shown in FIG. 1;

FIG. 6 is an enlarged isometric view of the other valve body section component of the convertible check valve shown in FIG. 1;

FIG. 7 is an enlarged isometric view of a flapper valve component of the convertible check valve shown in FIG. 1;

DETAILED DESCRIPTION OF THE PREFERRED EMBODIMENTS

Figure 1:
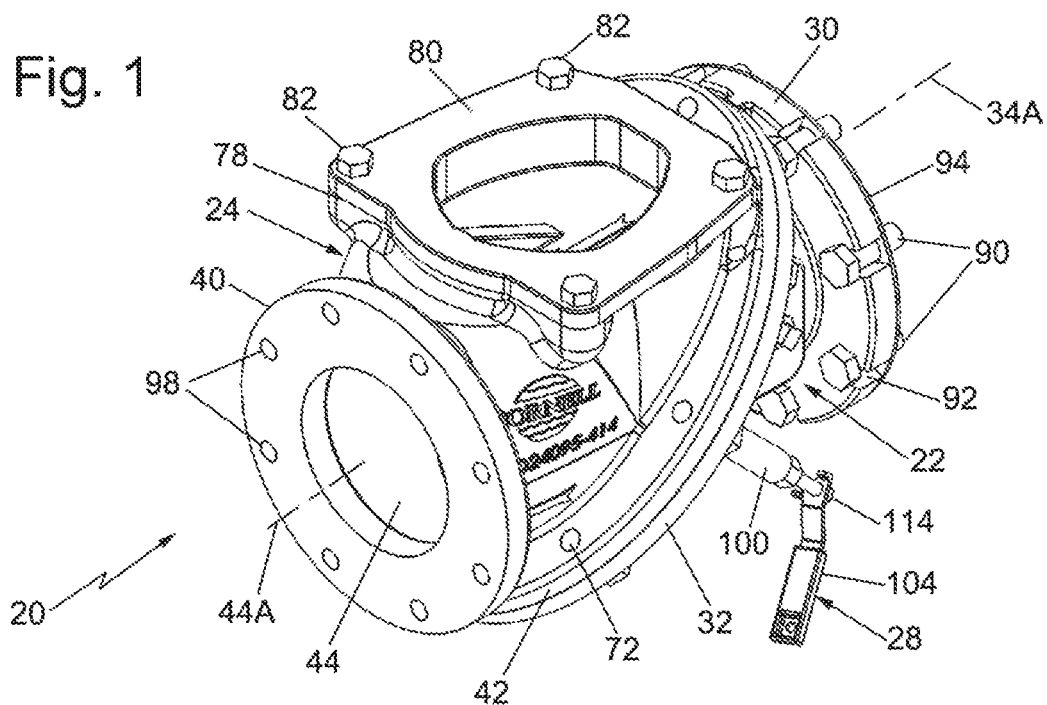
FIG. 1 is an isometric view of one exemplary embodiment of a convertible check valve, which can be configured in either an aligned state or an angled (elbow) state, and which is constructed in accordance with this invention, with the valve being shown in its aligned state.

Referring now to the drawings wherein like characters refer to like parts there is shown at 20 in FIG. 1 one exemplary embodiment of a convertible check valve constructed in accordance with this invention. The convertible check valve 20 is suitable for use in any liquid carrying application requiring the ability to prevent backflow, e.g., water and waste water treatment systems, and wherein the valve can be connected between an inlet pipe and an outlet pipe that are either axially aligned or extend perpendicularly to each other. The valve 20, as described below, is merely one example of various convertible check valves that can be constructed in accordance with this invention. Thus, as can be seen, the convertible check valve 20 basically comprises a first valve body section 22, a second valve body section 24, a flapper valve member 26 (FIG. 3), and a pressure release assembly 28. The first valve body section 22 is best seen in FIGS. 3, 4, 6, 8A and 9A and includes an outer end in the form of a peripheral flange 30, an inner end in the form of a peripheral flange 32, and a central passageway 34 extending fully through the body section 22 between the flanges 30 and 32. The passageway 34 serves as the inlet passageway for the check valve 20 and has a central longitudinal axis 34A. The flange 32 includes a planar inner end surface 36 that extends at an angle of 45 degrees to the central longitudinal axis 34A. The outer flange 30 includes a planar end surface 38 (FIGS. 8A through 9B) that extends at an angle of 90 degrees to the central longitudinal axis 34A. The outer flange 30 is arranged to be releasably secured to a flanged input pipe (not shown), via associated threaded fasteners, e.g., hex bolts or screws, as will be described later.

The second valve body section 24 is best seen in FIGS. 3, 4, 5, 8A and 9A and includes an outer end in the form of a peripheral flange 40, an inner end in the form of a peripheral flange 42, and a central passageway 44 extending fully through the body section 22 between the flanges 40 and 42. The passageway 44 serves as the outlet passageway for the convertible check valve 20 and has a central longitudinal axis 44A. The flange 42 includes a planar inner end surface 46 that extends at an angle of 45 degrees to the central longitudinal axis 44A. The outer flange 40 includes a planar end surface 48 (FIGS. 8A through 9B) that extends at an angle of 90 degrees to the central longitudinal axis 44A. The outer flange 40 is arranged to be releasably secured to a flanged outlet pipe (not shown) via associated threaded fasteners, e.g., hex bolts or screws, as will be described later.

Figure 2:
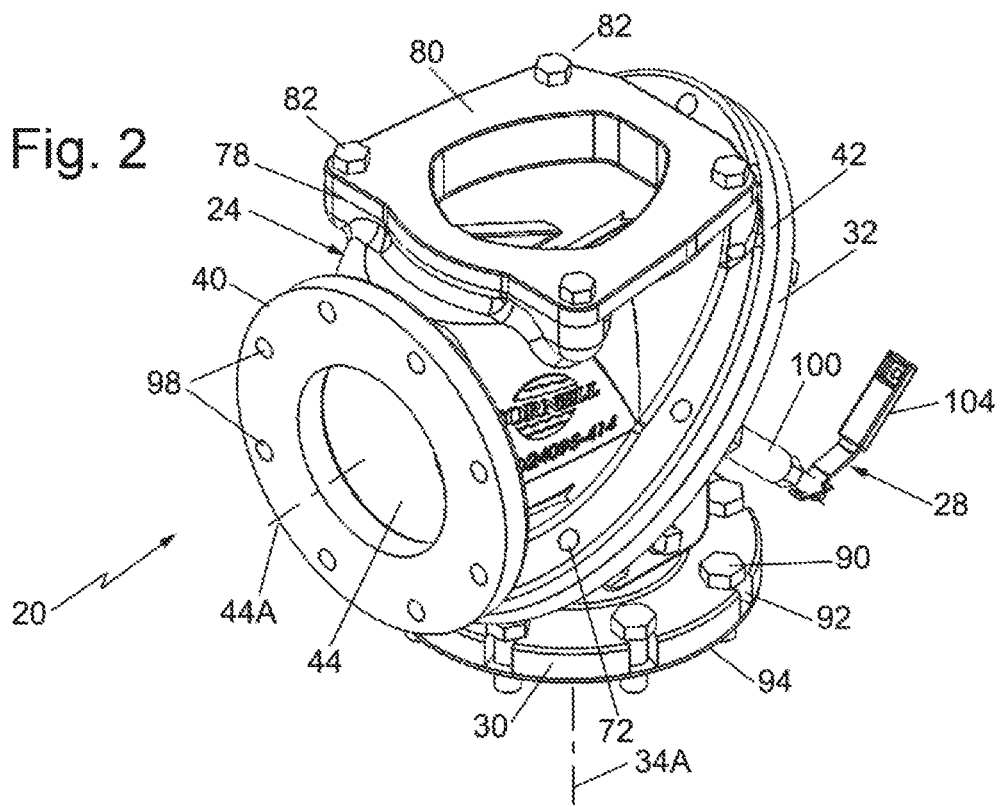
FIG. 2 is an isometric view similar to FIG. 1, but showing the convertible check valve of FIG. 1 is its angled (elbow) state.
Figure 8A:
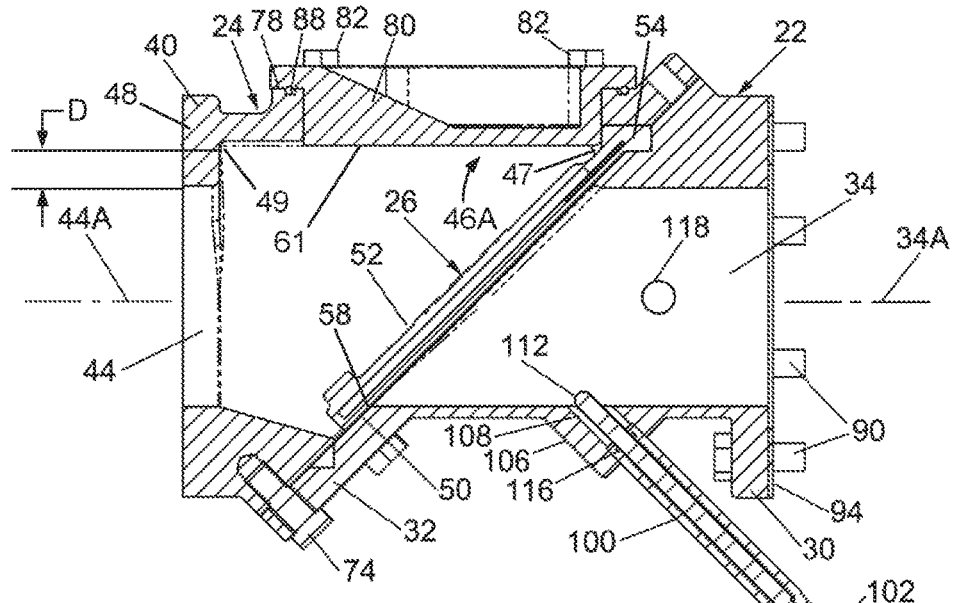
FIG. 8A is a side elevation view in vertical section showing the convertible check valve of FIG. 1 in its aligned state with the flapper in a closed position.
Figure 9A:
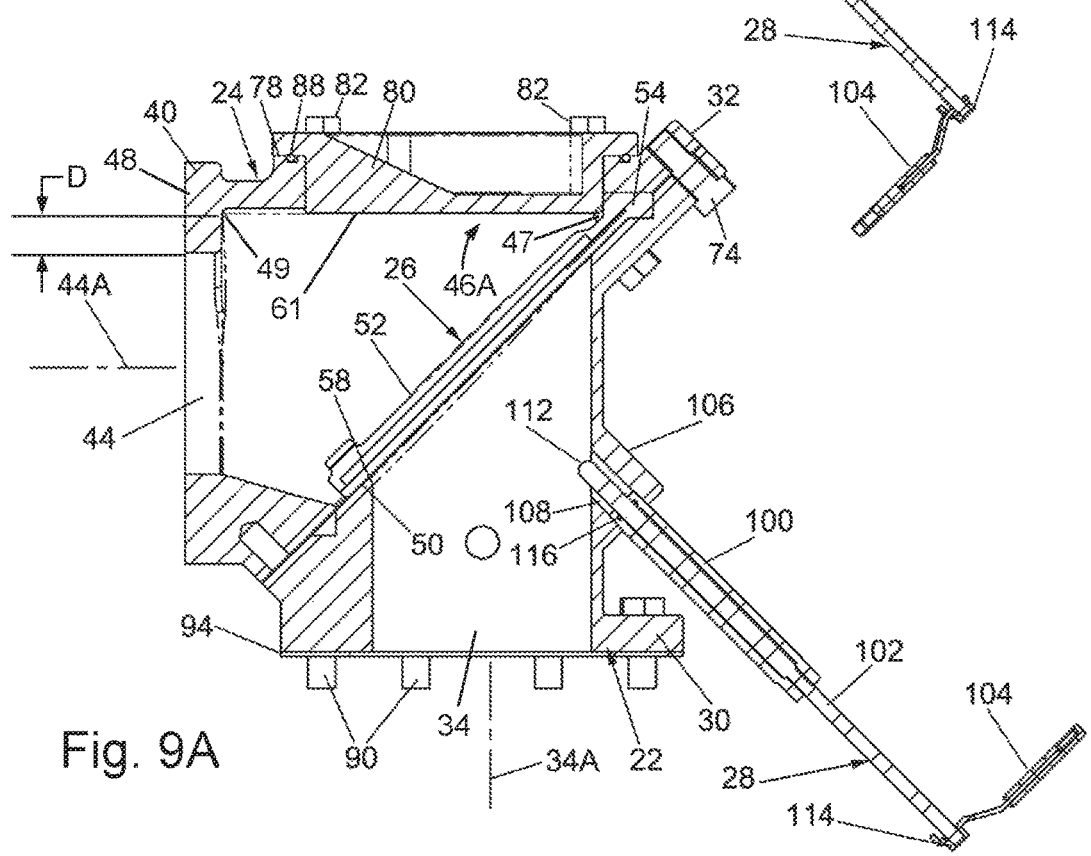
FIG. 9A is a side elevation view in vertical section showing the convertible check valve of FIG. 1 in its angled (elbow) state.
Figure 8B:
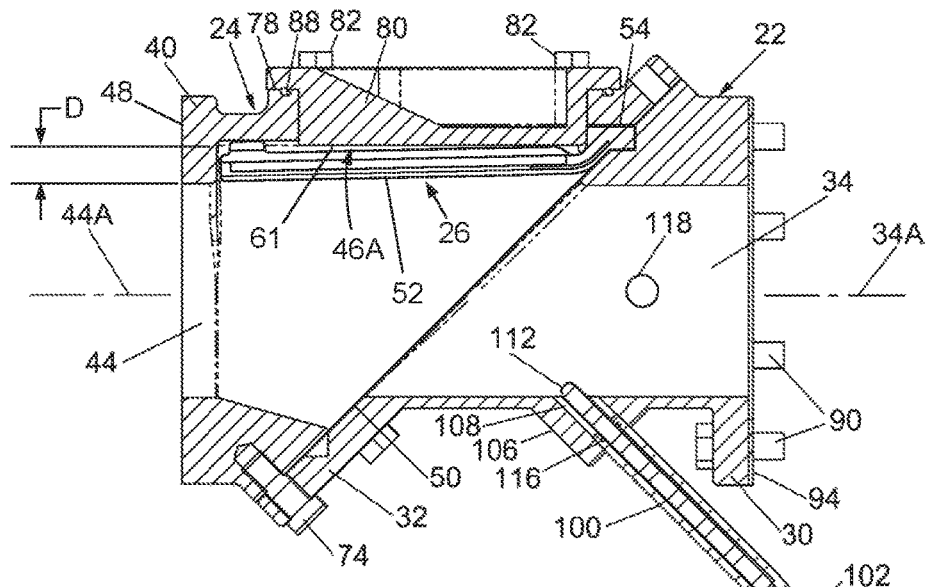
FIG. 8B is the side elevation view of FIG. 8A with the flapper valve shown in an open position.
Figure 9B:
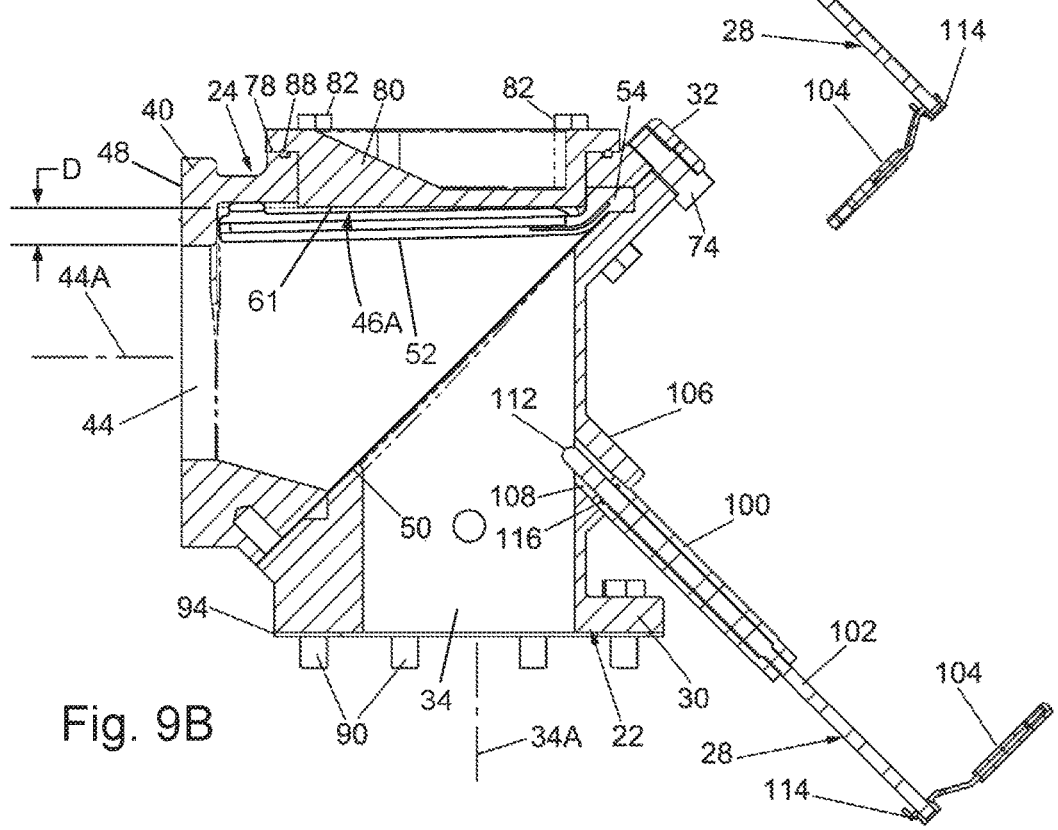
FIG. 9B is the side elevation view of FIG. 9A with the flapper valve shown in an open position.

The body sections 22 and 24 are configured to be releasably secured to each other in either one of two configurations or states, namely, an axially aligned configuration, best seen in FIGS. 1, 8A, 8B, and 10, and an angled configuration, best seen in FIGS. 2, 9A, and 9B. In the axially aligned configuration the central axes 34A and 44A of the passageways 34 and 44, respectively, are axially aligned, i.e., are coaxial. In the angled configuration the central axes 34A and 44A of the passageways 34 and 44, respectively, are perpendicular to each other, whereupon the valve 20 is configured as an elbow valve. The flapper valve member 26 (also sometimes referred to hereinafter as the "flapper") is mounted within and between the valve body sections 22 and 24 irrespective of their orientation.

As will be appreciated by those skilled in the art from the discussion to follow, the manner in which the valve body sections 22 and 24 are of the convertible check valve 20 are configured and the manner in which the flapper 26 is mounted between and within those sections enables those sections to be readily releasably connected in either the aligned state or the elbow state. Moreover, the convertible check valve 20 is relatively compact, simple in construction and efficient in operation, thus enabling it be used in any application requiring either an aligned configuration or an elbow configuration. Accordingly, users only need to stock one convertible check valve for both applications and without any sacrifice in size or operating efficiency.

The portion of the planar angled inner surface 36 of the first valve body section 22 that is contiguous with and surrounds the central passageway 34 forms the valve seat 50 for the flapper 26. That open inner end of the passageway 34 at the valve seat 50 forms an outlet flow port for the valve body section 22. Since the inner surface 36 extends at an angle of 45 degrees to the central longitudinal axis 34A, the outlet flow port is elliptical in shape. The outlet flow port of the first body section 22 is arranged to be coupled to an inlet flow port of the valve body section 24 at an interface that enables maximum flow of fluids between the valve body sections, irrespective of whether those sections are in the aligned orientation or elbow orientation. To that end, the open inner end of the outlet passageway 44 at the angled inner surface 46 of the valve body section 24 forms an outlet flow port for the valve body section 24. Since the inner surface 46 extends at an angle of 45 degrees to the central longitudinal axis 44A, the outlet flow port of the valve body section 24 is elliptical in shape and identical in size and profile to the inlet flow port of the valve body section 22.

A notch or recess 46A is located in the body section 24 at the top of the outlet flow port to accommodate a portion of the flapper valve member 26, as will be described later, when the check valve 20 is in its open state enabling fluid to flow from the passageway 34 to the passageway 44, irrespective whether the valve is in the aligned configuration or the elbow configuration.

Figure 3:
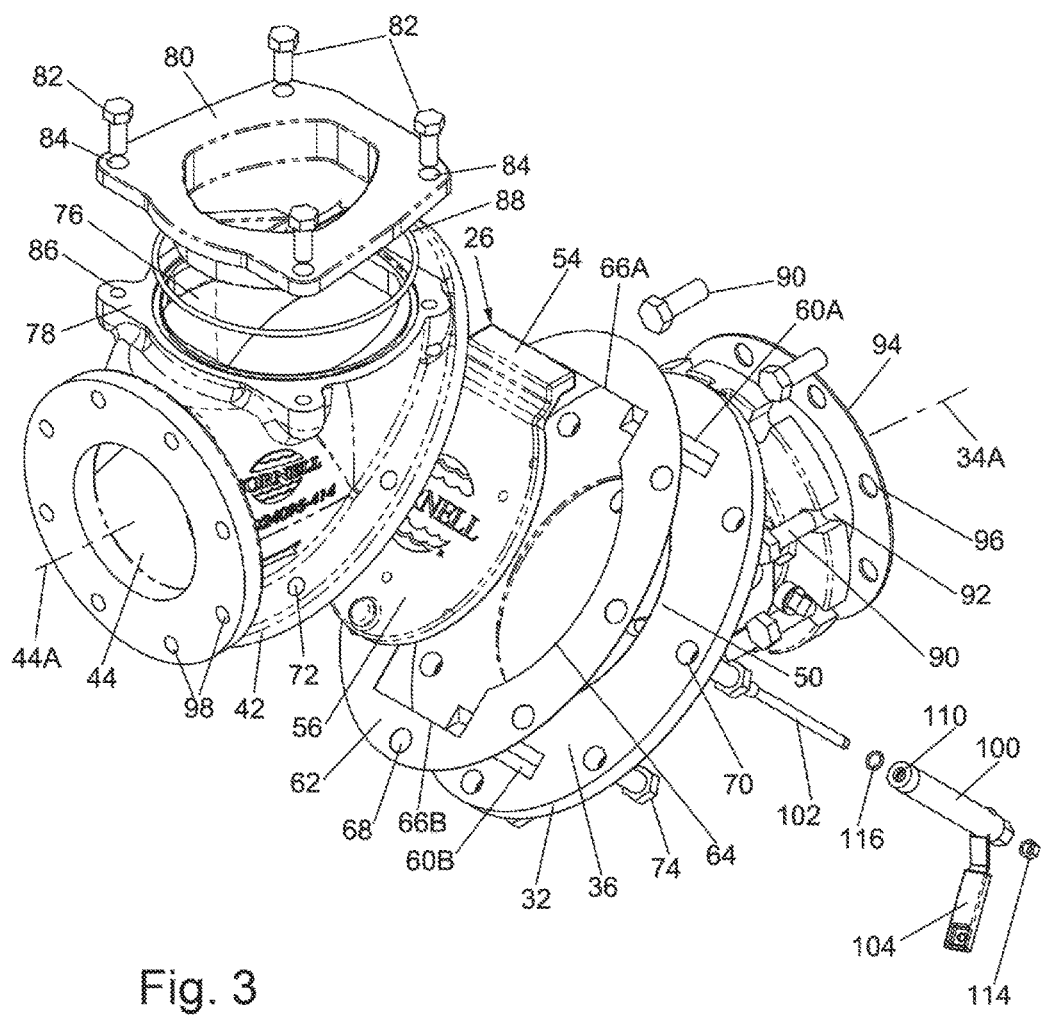
FIG. 3 is an enlarged exploded isometric view of the convertible check valve of FIG. 1 shown in its aligned state.

Turning now to FIGS. 3, 4 and 7, the details of the flapper 26 will now be described. The flapper is a unitary body that is preferably formed of a resilient and flexible material, e.g., rubber, although it may be formed of a rigid material, as will be discussed later. The body of the exemplary flapper shown in those figures basically comprises a main section 52 and a mounting section 54. The main section is of elliptical peripheral shape having a relatively long longitudinal axis 52A and a relatively short transverse axis 52B. Those axes intersect at the middle 56 of the main section 52. The resilient material making up the flapper 26 preferably includes internal reinforcement, e.g., a nylon strip, located at the interface between the main section 52 and the mounting section 54 and which is embedded in the rubber making up the flapper. It is at this interface that the flapper valve member will pivot or flex when the check valve 20 is in operation, as will be described later. The reinforcement ensures that the main section 52 of the flapper valve member 26 will not tear off in high flow rates.

As can be seen clearly in FIGS. 3, 4, 8A, 8B, 9A, and 9B, the main section 52 of the flapper valve member 26 is slightly larger than the flow port of the first body section 22. The undersurface of the main section 52 of the flapper 26 is planar and the portion of that undersurface contiguous with the periphery of the main section is in the form of an engagement surface 58. The engagement surface 58 is arranged to brought into sealing engagement with the valve seat 50 when an overpressure situation exists in the passageway 44 (e.g., upon an attempted reverse flow), as will be described later, or when there is no fluid flowing through the valve 20.

The mounting of the flapper valve member 26 between the valve body sections 22 and 24 is accomplished by means of a pair of recesses 60A and 60B located in the inner surface 36 of the valve body section 22. Those recesses are located diametrically opposed to each other along the longitudinal axis of the inlet flow port of that valve section. Each recess is an elongated shaped cavity that extends perpendicularly to that longitudinal axis and each recess is configured to receive (mate with) the mounting section 54 of the flapper valve member 26 when the valve body sections are in a particular orientation. For example, when the valve 20 is in its aligned state the recess 60A receives the mounting section 54 of the flapper valve member 26. When the valve 20 is in its angled (elbow) state the recess 60B receives the mounting section 54 of the flapper valve member 26.

Recess 46A is aligned with either of recess 60A or 60B depending on the orientation of check valve 20. In one implementation, as shown in FIGS. 8A-10, recess 46A may form an elliptically-shaped planar surface 61, extending parallel to longitudinal axis 44A from a proximal end 47 to a distal end 49, along the top of the outlet flow port in the body section 24. As shown in FIGS. 8B and 9B, recess 46A may be sized to receive the entirety of main section 52 of flapper 26 against the elliptically-shaped planar surface 61. Recess 46A may have a depth, D, approximately equal to the thickness of main section 52. Thus, when valve body sections 22 and 24 are axially aligned and check valve 20 is in an open state, the entirety of flapper 26 is outside the flow path from the passageway 34 to the passageway 44, as shown in FIG. 8B. Similarly, when valve body sections 22 and 24 are in an angled position and check valve 20 is in an open state, the entirety of flapper 26 is also outside the flow path from the passageway 34 to the passageway 44, as shown in FIG. 9B. The shape of planar surface 61 may be closely matched to the elliptical shape of main section 52 to prevent pooling within recess 46A when check valve 20 is in an open state. Furthermore, fluid flow from the passageway 34 to the passageway 44 will generally force main section 52 against planar surface 61 so as to minimize flexing between main section 52 and mounting section 54 and minimize fatigue or deformation of flapper 26.

A gasket 62 formed of any suitable material is disposed between the inner surfaces 36 and 46 of the flanges 32 and 42, respectively, to prevent the leakage of any fluid from that interface when the two valve body sections are connected together in either the aligned or elbow configurations. As best seen in FIGS. 3 and 4 the gasket 62 is of elliptical shape corresponding to the elliptical shape of the flanges 32 and 42. The gasket 62 includes a central window 64 of generally elliptical shape and whose size is slightly larger than the inlet flow port of the valve body section 22 so that the valve seat 50 is not covered by the gasket 62. Moreover, the window 64 includes a pair of notches 66A and 66B, which are located diametrically opposed to each other along the longitudinal axis of the elliptical shaped window so that the notch 66A leaves the recess 60A of the flange 32 uncovered and the notch 66B leaves the recess 60B of the flange 32 uncovered. The gasket 60 also includes a plurality of equidistantly spaced apertures 68 located close to its periphery. The apertures 68 are arranged to be aligned with correspondingly equidistantly spaced holes 70 extending about the flange 32 of the body section 22 and also aligned with correspondingly equidistantly spaced internally threaded holes 72 extending about the flange 42 of the body section 24. Those axially aligned holes and apertures are arranged to receive respective threaded fasteners, e.g., hex head bolts or screws, 74 to releasably secure the flanges 32 and 42 to each other irrespective of whether the valve body sections are in the aligned or elbow configurations. For example, when the valve body section 22 and 24 are in their aligned configuration or state the mounting section 54 of the flapper valve member 26 is extended through notch 66A in the gasket 62 and into the recess 60A, at the same time a portion of the mounting section 54 extends into the recess 46A of the valve body section 24. The threaded fasteners 74 can then be tightened to secure the two valve body sections together, thereby locking the mounting section 54 of the flapper valve member in that recess. Accordingly, if there is no liquid flowing through the valve the engagement surface 58 of the flapper valve member will be in tight, sealing engagement with the valve seat 50 to isolate the passageways 34 and 44 from each other. With the valve in this state it can be connected between axially aligned inlet and outlet pipes to carry liquid from the inlet pipe to the outlet pipe.

In order to convert the valve to the elbow configuration, the threaded fasteners 74 are disengaged to free the two valve body sections 22 and 24 from each other. This enables those valve body sections to be rotated 180 degrees with respect to each other, so that the mounting section 54 of the flapper 26 is extended through notch 66B in the gasket 62 and into the recess 60B with a portion of the mounting section 54 extending into the recess 46A of the valve body section 24. The threaded fasteners 74 can then be engaged and tightened to secure the two valve sections together, thereby locking the mounting section 54 of the flapper 26 in that recess. Accordingly, the engagement surface 58 of the flapper will be in tight, sealing engagement with the valve seat 50 to isolate the passageways 34 and 44 from each other and the valve will now be ready to be reconnected between perpendicularly disposed inlet and outlet pipes so that liquid can then flow through the valve from the inlet pipe to the outlet pipe.

As best seen in FIGS. 1 and 2, the valve body section 24 includes a window or port 76 that provides access to the flapper 26. The window 76 is located within a planar top surface portion 78 of the valve body section 24 (e.g., directly above elliptically-shaped planar surface 61). A cover member 80 (also referred to herein as a "clean-out cover") is releasably secured within the window 76 to seal the window. That releasable securement is achieved by means of plural threaded fasteners, e.g., hex bolts or screws, 82 extending through holes 84 in the clean-out cover 80 and axially aligned internally threaded holes 86 in the top surface portion 78 of the valve body section 24. An O-ring seal 88 is interposed between the clean-out cover 80 and the planar top surface portion 78 to form a fluid-tight interface therebetween.

With valve body section 24 constructed as just described, in the event that it is desired to have access to the flapper 26, e.g., to inspect it or to replace it, all that is required is to loosen the bolts or screws 82 to remove them from threaded engagement with the holes 84, whereupon the clean-out cover 80 can be removed from the window 76. This provides access to the flapper 26 through that window. If it is desired to replace the flapper the bolts or screws 74 securing the two valve body sections 22 and 24 are loosened so that the flanges 32 and 42 of the valve body sections 22 and 24, respectively, can be separated slightly from each other. This action frees the mounting section 54 of the flapper from whichever recess 60A or 60B in which it had been located (depending upon whether the valve was in the aligned configuration or the elbow configuration). The flapper 26 can then be removed from the interior of the check valve 20 through the window 76 and a new flapper can then be inserted into the check valve through the window so that its mounting section 54 is located in the recess 60A or 60B, as the case may be. The clean-out cover 80 can then be placed back into the window 76 and its screws or bolts 82 screwed back in place. The screws or bolts 74 in the flanges 32 and 42 can then be retightened, thereby trapping the mounting section 54 of the flapper 26 within that recess by the engagement of the contiguous surfaces of the valve sections and the cover with the mounting section and tightly sealing the gasket 62 between the flanges 32 and 42.

The valve body section 22 of the assembled valve 20, whether in the aligned state or the elbow state, serves as the valve's inlet section and is adapted be connected to a flanged pipe (not shown) carrying the liquid, e.g., water, to the valve 20. That connection is achieved by means of plural threaded fasteners 90, e.g., hex bolts or screws, which extend through respective equidistantly spaced slots 92 in the periphery of the flange 30. A gasket 94, having plural equidistantly spaced holes 96 for receipt of respective ones of the fasteners 90 is provided to form a fluid-tight seal between the flange 30 of the valve 20 and the flange of the inlet pipe (not shown). The valve body section 24, which serves as the outlet section of the valve 20, is also arranged to be connected to a flanged outlet pipe (not shown). That connection is achieved by means of plural threaded fasteners, e.g., hex bolts or screws, (not shown) which extend through respective holes in the flange of the outlet pipe into threaded engagement with respective equidistantly spaced internally threaded holes 98 in the flange 40. A gasket (not shown) will also be used at the interface of the flange 40 and the flange of the outlet pipe to prevent the egress of liquid at that interface.

Operation of the check valve 20 in either the aligned configuration or the elbow is the same. In particular, so long as the fluid pressure within the inlet passageway 34 of the valve body section 22 is above the cracking or operating pressure of the valve 20, the main portion 52 of the flapper valve member 26 will be flexed or pivoted upward (i.e., into recess 46A), so that its engagement surface 58 will be off of the valve seat, with the portion of the flapper valve member 26 contiguous with the mounting section 54 being disposed within the recess 46A. Accordingly, the elliptical shaped flow port of the inlet valve body section 22 will be in full fluid communication with the elliptical flow port of the outlet valve body section 24, thereby enabling fluid to flow efficiently and unimpeded from the inlet passageway 34 to the outlet passageway 44 via the mating identically sized and shaped elliptical flow ports. If however, there should be some back pressure in the outlet passageway 44, which exceeds the predetermined operating pressure of the check valve 20, the flapper 26 will be flexed and pivoted downward toward the valve seat 50 by that over-pressure, whereupon the contact surface 58 of the flapper valve member 26 will move into fluid-tight engagement with the valve seat 50. This action thereby isolates the inlet passageway 34 from the outlet passageway 44 and thus prevents any back flow of liquid from the outlet passageway to the inlet passageway.

As mentioned earlier the check valve 20 includes a pressure relief assembly 28. The pressure relief assembly is provided to enable one to crack open (lift) the flapper 26 from the valve seat 50 slightly so liquid, e.g., water, can slowly seep thereby and equalize the pressure within the check valve. This is typically done if the pressure on the outlet side of the check valve gets too high or if one desires to service the valve. The pressure relief assembly is best seen in FIGS. 3, 4, and 8A-10 and basically comprises a tubular housing section 100, an actuator or push rod 102, and a handle 104. The tubular housing 100 is an elongated hollow member that extends outward at an angle from the valve body section 22. In particular, as best seen in FIGS. 8A-10 the valve body section 22 includes a projection 106 from the undersurface of that body section. The projection 106 includes a passageway 108 extending through it and which is in communication with the interior of the inlet passageway 34. The longitudinal central axis of the passageway 108 is at 45 degrees to the central axis 34A of the valve body section 22 and intersects the flapper 26 at the center 56 of the flapper's main section 52 on its underside. Moreover, the central axis of the passageway 108 is perpendicular to the plane of that section. The tubular housing section 100 is fixedly mounted within the passageway 108 and also includes a passageway 110 (FIG. 3) extending through it and which is coaxial with the longitudinal central axis of the passageway 108. The outer end of the central passageway 110 is open and includes internal threads.

The actuator or push rod 102 is an elongated member that extends through the central passageway 110, with the central longitudinal axis of the rod being coaxial with the central longitudinal axis of the passageway 108. The free end, e.g., inner end, 112 of the rod is rounded. The portion of the rod 102 adjacent its outer end includes external threads for threaded engagement with the internal threads of the passageway 110. The handle 104 is connected to the threaded outer end of the rod by a nut 114. An O-ring 116 is disposed within the passageway 110 interposed between it and the rod 102. The O-ring 116 thus acts as a seal to prevent the egress of any fluid through the interface between the rod and the passageway 110.

Figure 10:
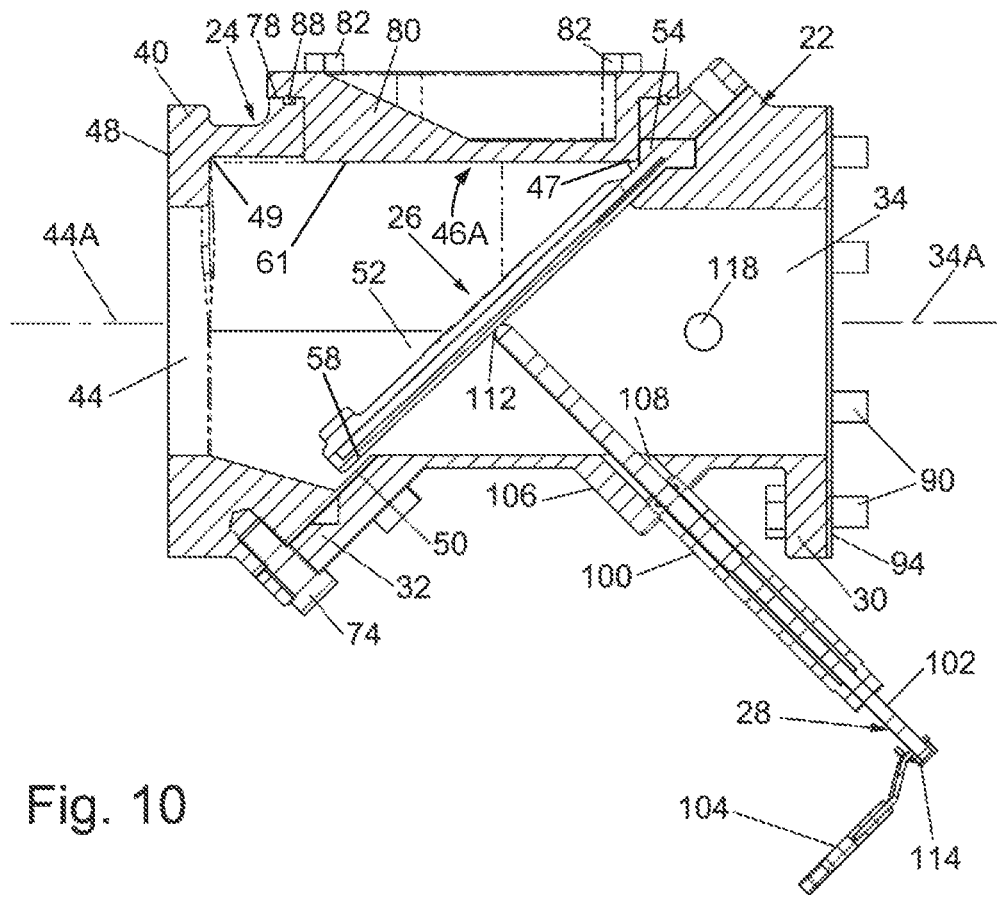
FIG. 10 is a side elevation view similar to FIG. 8, but showing the pressure relief assembly of the convertible check of FIG. 1 in its extended state to relieve pressure within the valve.

The rod 102 is arranged to be extended from a retracted position, like shown in FIGS. 8A and 9A, to an extended position, like shown in FIG. 10, irrespective of whether the valve is in its aligned state or its elbow state. The extension of the rod to its extended position serves to move or pivot the flapper 26 slightly off of the valve seat 50 to crack the check valve open should that action be necessary or desirable. In accordance with one preferred aspect of this invention, the end 112 of the actuator rod 102 is configured to engage the center 56 of the flapper 26 to ensure that the pressure relief assembly operates correctly irrespective of whether the check valve is in the aligned configuration or the elbow configuration. As mentioned earlier the longitudinal axis of the actuator rod 102 is perpendicular to the plane of the undersurface of the main portion of the flapper 26. This ensures that when the rod 102 presses on the center 56 of the flapper 26 the rod will be in compression and will not flex or deform.

Operation of the pressure relief assembly 28 is as follows. The handle 104 of the assembly 28 is rotated or spun in the clockwise direction, whereupon the threaded engagement of the threads on the rod 102 and the threads in the passageway 100 will move the rod inward until its free end 112 engages the center 56 of the flapper valve member 26, thereby lifting its engagement surface 58 slightly off of the valve seat 50 to let the liquid seep slowly thereby, as shown in FIG. 10. It should be pointed out at this juncture that the lifting of the flapper 26 by the extension of the rod 102 is very slight and is shown exaggerated in FIG. 10 for the purposes of illustration.

When pressure relief is no longer necessary, the handle 104 of the assembly 28 is rotated or spun in the counter-clockwise direction to retract the actuator rod 102 to its retracted position, thereby enabling the natural resiliency of the flapper 26 to move the flapper back into a fluid-tight sealing engagement with the valve seat.

As best seen in FIGS. 8A-10, the valve body member 22 includes an aperture in which a plug 118 is located. The aperture is in communication with the interior of the inlet passageway 34, but is closed off or sealed by the presence of the plug 118. The aperture serves as an access port for a flow meter (not shown) or some other device to be inserted into the passageway 34.

As should be appreciated by those skilled in the art, various modifications can be made to the convertible check valve 20, within the scope of this invention, so long as the engaging surfaces of the two body sections extend at an angle of 45 degrees to the fluid passageways extending to those surfaces, and so long as the two communicating ports of those two surface are elliptical in shape and of the same size and profile. By so doing the interface between those communicating ports will be of a maximum size irrespective of whether or not the valve is in the aligned state or the elbow state, whereupon there will be an efficient flow of liquid between the two body sections in either of those states. Moreover, as stated above, while the preferred embodiment shown and described makes use of a flexible flapper 26, that is not mandatory. Thus, this invention contemplates use of a flapper that is rigid, but is mounted in such a way, e.g., by means of a hinge, etc., so that the flapper can pivot about an axis between the closed state and the opened state, and vice versa. This alternative rigid flapper construction appears preferable for high flow versions of a valve constructed in accordance with this invention, where use of a flexible, e.g., rubber, flapper may prove problematic because the high flow of the fluid may cause shedding of the flexible material, e.g., rubber, making up the flapper.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A convertible check valve comprising:
   a first valve body section having a first passageway extending therethrough, said first passageway having a first longitudinal axis, said first body section including a first flange at one end thereof, said first flange having a first end surface extending at an angle of 45 degrees to said first longitudinal axis and at which said first passageway terminates, whereupon a shape of said first passageway at said first end surface is elliptical to establish a first elliptical shaped flow port thereat;
   a second valve body section having a second passageway extending therethrough, said second passageway having a second longitudinal axis, said second body section including a second flange at one end thereof, said second flange having a second end surface extending at an angle of 45 degrees to said second longitudinal axis and at which said second passageway terminates, whereupon a shape of said second passageway at said second end surface is elliptical to establish a second elliptical shaped flow port thereat, said second end surface of said second flange being configured to be connected to said first end surface of said first flange in either an aligned configuration or an angled configuration, wherein said first and second longitudinal axes are collinear when in said aligned configuration and are perpendicular to each other when in said angled configuration; and
   a flapper valve member configured to be moved between a closed state and an opened state, and vice versa, said flapper valve member being configured to close said elliptical flow ports and thereby isolate said second passageway from said first passageway when said flapper valve member is in said closed state, said flapper valve member being configured to open said elliptical flow ports to enable fluid communication between said second passageway and said first passageway through said elliptical flow ports when in said opened state, wherein said second valve body section additionally comprises a recess to receive the flapper valve member when in the opened state, and wherein, when positioned within the recess, the flapper valve member is outside an area of a flow path between the first and second elliptical shaped flow ports.

2. The convertible check valve of claim 1 wherein said flapper valve member includes an engagement portion located adjacent a periphery of said flapper valve member, and wherein said engagement portion is configured to engage a portion of said first valve body section immediately adjacent said first end surface to close said ports when said flapper member is in said closed state.

3. The convertible check valve of claim 2 wherein said flapper valve member comprises a main section, said main section being of elliptical peripheral shape having a longitudinal axis and a transverse axis, with said longitudinal axis of said main section being longer than said transverse axis of said main section, and wherein said engagement portion of said flapper valve member is located adjacent a periphery of said main section.

4. The convertible check valve of claim 3 wherein said flapper valve member is formed of a flexible material and additionally comprises a mounting section, said mounting section projecting outward from said main section at a portion of the periphery of said main section on said longitudinal axis of said main section, wherein said mounting section is configured to be releasably secured to a portion of said first flange, and wherein said main section of said flapper valve member can be flexed with respect to said mounting section when said mounting section is secured to said portion of said first flange to enable said main section to be moved from said closed state to said opened state and vice versa.

5. The convertible check valve of claim 4 wherein said flapper valve member is reinforced at an interface between said mounting section and said main section.

6. The convertible check valve of claim 4 wherein said first flange includes a pair of recesses located diametrically opposed to each other, with one recess of said pair of recesses being configured to receive said mounting section of said flapper valve member when said convertible check valve is in said aligned configuration, and with the other recess of said pair of recesses being configured to receive said mounting section of said flapper valve member when said convertible check valve is in said angled configuration.

7. The convertible check valve of claim 6 wherein said second valve body section additionally comprises planar portion extending parallel to said second longitudinal axis, an opening in said planar portion, and a clean-out cover releasably secured to said planar portion.

8. The convertible check valve of claim 7 wherein said clean-out cover is located adjacent a particular recess, of the pair of recesses in said first flange, in which said mounting section of said flapper valve member is located irrespective of whether the convertible check valve is in said aligned configuration or said angled configuration, whereupon removal of said clean-out cover provides access to said mounting section of said flapper valve member.

9. The convertible check valve of claim 8 additionally comprising an O-ring located between said planar portion of said second valve body section and said clean-out cover.

10. The convertible check valve of claim 3 additionally comprising a pressure relief assembly, said pressure relief assembly comprising an elongated member having a free end in communication with said first passageway and configured to be extended to engage said flapper valve member at an intersection of said longitudinal and transverse axes of said flapper valve member to cause said engagement portion of said flapper valve member to be moved out of engagement with said portion of said first valve body section immediately adjacent said first end surface to thereby enable some fluid communication between said first and second passageways.

11. The convertible check valve of claim 10 wherein said elongated member includes an outer portion extending out of said first valve body section and wherein first said pressure relief assembly additionally comprises a handle coupled to said outer portion for moving said elongated member with respect to said first valve body section to bring said free end of said elongated member into engagement with said flapper valve member.

12. The convertible check valve of claim 11 wherein said pressure relief assembly comprises a tubular section extending out of said first valve body section and through which said elongated member extends, said tubular section including internal threads, said elongated member including external threads configured for engagement with said internal threads whereupon rotation of said handle causes movement of said free end of said elongated member toward or away from said flapper valve member depending upon a direction of rotation of said handle.

13. The convertible check valve of claim 12 wherein said longitudinal axis and said transverse axis of said flapper valve member intersect at a center of said main section of said flapper valve member, and wherein said elongated member has a longitudinal axis which intersects said flapper valve at said center of said flapper valve member and said longitudinal axis of said elongated member extends perpendicularly to said main section of said flapper valve member.

14. The convertible check valve of claim 1 additionally comprising a gasket interposed between said first and second end surfaces.

15. The convertible check valve of claim 1 additionally comprising an aperture in said first valve body section in communication with said passageway and a plug releasably secured in said aperture.

16. The convertible check valve of claim 1 wherein said flapper valve member is flexible.

17. The convertible check valve of claim 16 wherein said flapper valve member comprises rubber.

18. The convertible check valve of claim 1 wherein the recess substantially matches a shape of the flapper valve member.

19. A convertible check valve comprising:
a first valve body section having a first passageway extending therethrough, said first passageway having a first longitudinal axis, said first body section including a first flange at one end thereof, said first flange having a first end surface extending at an angle of 45 degrees to said first longitudinal axis and at which said first passageway terminates, whereupon a shape of said first passageway at said first end surface is elliptical to establish a first elliptical shaped flow port thereat;
a second valve body section having a second passageway extending therethrough, said second passageway having a second longitudinal axis, said second body section including a second flange at one end thereof, said second flange having a second end surface extending at an angle of 45 degrees to said second longitudinal axis and at which said second passageway terminates, whereupon a shape of said second passageway at said second end surface is elliptical to establish a second elliptical shaped flow port thereat, said second end surface of said second flange being configured to be connected to said first end surface of said first flange in either an aligned configuration or an angled configuration, wherein said first and second longitudinal axes are collinear when in said aligned configuration and are perpendicular to each other when in said angled configuration;

a flapper valve member configured to be moved between a closed state and an opened state, and vice versa, said flapper valve member being configured to close said elliptical flow ports and thereby isolate said second passageway from said first passageway when said flapper valve member is in said closed state, said flapper valve member being configured to open said elliptical flow ports to enable fluid communication between said second passageway and said first passageway through said elliptical flow ports when in said opened state, wherein said flapper valve member includes an engagement portion located adjacent a periphery of said flapper valve member, and wherein said engagement portion is configured to engage a portion of said first valve body section immediately adjacent said first end surface to close said ports when said flapper member is in said closed state, wherein said flapper valve member further includes a main section, said main section being of elliptical peripheral shape having a longitudinal axis and a transverse axis, with said longitudinal axis of said main section being longer than said transverse axis of said main section, and wherein said engagement portion of said flapper valve member is located adjacent a periphery of said main section; and a pressure relief assembly, said pressure relief assembly comprising an elongated member having a free end in communication with said first passageway and configured to be extended to engage said flapper valve member at an intersection of said longitudinal and transverse axes of said flapper valve member to cause said engagement portion of said flapper valve member to be moved out of engagement with said portion of said first valve body section immediately adjacent said first end surface to thereby enable some fluid communication between said first and second passageways.

20. A convertible check valve comprising:

a first valve body section having a first passageway extending therethrough, said first passageway having a first longitudinal axis, said first body section including a first flange at one end thereof, said first flange having a first end surface extending at an angle of 45 degrees to said first longitudinal axis and at which said first passageway terminates, whereupon a shape of said first passageway at said first end surface is elliptical to establish a first elliptical shaped flow port thereat;

a second valve body section having a second passageway extending therethrough, said second passageway having a second longitudinal axis, said second body section including a second flange at one end thereof, said second flange having a second end surface extending at an angle of 45 degrees to said second longitudinal axis and at which said second passageway terminates, whereupon a shape of said second passageway at said second end surface is elliptical to establish a second elliptical shaped flow port thereat, said second end surface of said second flange being configured to be connected to said first end surface of said first flange in either an aligned configuration or an angled configuration, wherein said first and second longitudinal axes are collinear when in said aligned configuration and are perpendicular to each other when in said angled configuration; and a flapper valve member configured to be moved between a closed state and an opened state, and vice versa, said flapper valve member being configured to close said elliptical flow ports and thereby isolate said second passageway from said first passageway when said flapper valve member is in said closed state, said flapper valve member being configured to open said elliptical flow ports to enable fluid communication between said second passageway and said first passageway through said elliptical flow ports when in said opened state, wherein said flapper valve member includes an engagement portion located adjacent a periphery of said flapper valve member, and wherein said engagement portion is configured to engage a portion of said first valve body section immediately adjacent said first end surface to close said ports when said flapper member is in said closed state, wherein said flapper valve member further includes a main section, said main section being of elliptical peripheral shape having a longitudinal axis and a transverse axis, with said longitudinal axis of said main section being longer than said transverse axis of said main section, and wherein said engagement portion of said flapper valve member is located adjacent a periphery of said main section, wherein said flapper valve member is formed of a flexible material and additionally comprises a mounting section, said mounting section projecting outward from said main section at a portion of the periphery of said main section on said longitudinal axis of said main section, wherein said mounting section is configured to be releasably secured to a portion of said first flange, and wherein said main section of said flapper valve member can be flexed with respect to said mounting section when said mounting section is secured to said portion of said first flange to enable said main section to be moved from said closed state to said opened state and vice versa, wherein said flapper valve member is reinforced at an interface between said mounting section and said main section.

* * * * *